United States Patent [19]

Uwira

[11] Patent Number: 5,528,354
[45] Date of Patent: Jun. 18, 1996

[54] PICTURE DETECTING SENSOR UNIT

[75] Inventor: Bernd Uwira, Constance, Germany

[73] Assignee: Bodenseewerk Geratetechnik GmbH, Uberlingen/Bodensee, Germany

[21] Appl. No.: 88,640

[22] Filed: Jul. 9, 1993

[30] Foreign Application Priority Data

Jul. 10, 1992 [DE] Germany .................... 42 22 642.2

[51] Int. Cl.⁶ ............................ G01C 3/00; G01B 11/26; H04N 5/33; G02B 26/10
[52] U.S. Cl. ................. 356/5.01; 250/203.2; 250/206.2; 250/334; 250/342; 348/164; 356/141.1
[58] Field of Search ................ 356/5, 141.1, 5.01; 348/164; 250/203.2, 206.2, 342, 334

[56] References Cited

U.S. PATENT DOCUMENTS

| | | | |
|---|---|---|---|
| 3,644,043 | 2/1972 | Jones et al. | 356/5 |
| 3,698,812 | 10/1972 | Nelson | 356/5 |
| 3,854,821 | 12/1974 | Thompson | 356/152 |
| 3,953,667 | 4/1976 | Layton et al. | 178/6 |
| 4,497,065 | 1/1985 | Tisdale et al. | 382/1 |
| 4,561,775 | 12/1985 | Patrick et al. | 356/5 |
| 4,902,128 | 2/1990 | Siebecker et al. | 356/5 |
| 5,098,185 | 3/1992 | Watanabe et al. | 356/5 |
| 5,200,793 | 4/1993 | Ulich et al. | 356/5 |
| 5,243,553 | 9/1993 | Flockencier | 356/5 |
| 5,345,304 | 9/1994 | Allen | 356/5 |

FOREIGN PATENT DOCUMENTS

| | | | |
|---|---|---|---|
| 283222 | 9/1988 | European Pat. Off. | G01S 7/48 |
| 0436213 | 7/1991 | European Pat. Off. | G01S 17/88 |
| 2037583 | 2/1971 | Germany . | |
| 3839513 | 5/1990 | Germany | H04N 3/15 |
| 3942770 | 7/1991 | Germany | G01S 17/88 |
| 2226466 | 6/1990 | United Kingdom | G01S 17/87 |

OTHER PUBLICATIONS

Chu et al., "Multi–Sensor Image Interpretation Using Laser Radar and Thermal Images", Proceedings, 7th Conference on Artificial Intelligence Applications, Feb. 28, 1991, pp. 191–192.

Kelso et al., "AFTI/F–16 Sensor/Tracker System", Proceedings IEEE Naecon, vol. 2, May 23, 1986, pp. 550–552.

*Primary Examiner*—Stephen C. Buczinski
*Attorney, Agent, or Firm*—Lowe, Price, LeBlanc & Becker

[57] ABSTRACT

A picture detecting sensor unit has a passive sensor resolving a field of view into picture elements having different brightness. Picture processing means receive data from the picture detecting sensor. An additional active LADAR sensor having a laser emitting a laser beam and a scanning system for scanning an area of the field of view by this laser beam provides distance signals from the radiation reflected by an object in the field of view. The scanning of the field of view by the LADAR sensor is controlled by the picture processing means associated with the passive sensor such that the scanning effected by the LADAR sensor is limited to objects detected by the passive sensor in the field of view. A common imaging optical system is provided for the LADAR sensor and the passive sensor. A beam splitter separates the beams detected by the passive sensor and the returning beams of the LADAR sensor.

7 Claims, 6 Drawing Sheets

PICTURE DETECTING SENSOR UNIT

The invention relates to a picture detecting sensor unit comprising a passive sensor resolving a field of view into picture elements having different brightness, picture processing means being arranged to receive data therefrom.

Picture detecting sensor units are known, in which the individual picture elements of an observed field of view are imaged successively by means of movable optical elements onto a stationary detector. The field of view is thus picked-up point by point or row by row. Also sensors having a two-dimensional array of detector elements are known. Such sensors may be formed, e.g. by a CCD matrix. In such sensors, the field of view is imaged onto the detector elements of the sensor. The detector elements respond to radiation emitted or reflected by the objects of the field of view. The sensor itself does not emit any radiation, differently to e.g. RADAR. Such sensors are called "passive" picture detecting sensors.

Such passive sensors provide a light/dark pattern only, in which intensity values of the radiation falling on the sensor from the respective observation directions are associated with the different observation directions. The passive sensors do not provide any depth information, that is no information about the distance or the three-dimensional structure of a detected object.

Furthermore, it is known to combine a passive picture detecting optical sensor with an "active" sensor operating in the millimeter wavelength range. Such a sensor provides distance information. However the angular resolution of such a sensor operating in the millimeter wavelength range is small as compared to an optical picture detecting sensor. Therefore it is not or only to an insufficient extent possible to geometrically associate the informations of such a sensor with the individual picture elements. Furthermore, such combined sensor units are undesirably bulky.

Furthermore, LADAR sensors are known. Following RADAR, LADAR means, "Laser Detection and Ranging". Such sensors comprise a laser emitting a laser light beam. The laser light beam falls onto an object detected in the field of view. A photoelectric detector detects the light reflected by the object. The distance of the object can be determined from the travel time of the light beam to the object and back.

It is the object of the invention to provide a sensor unit permitting improved recognition of objects in an observed field of view.

It is a further object of the invention to provide a compact "dual-mode" sensor unit.

According to the invention, the indicated objects are achieved by a picture detecting sensor unit of the type mentioned in the beginning comprising a passive sensor resolving a field of view into picture elements having different brightness, and picture processing means arranged to receive data therefrom. The invention provides an additional active LADAR sensor having a laser emitting a laser beam and means for providing distance signals from the radiation of said laser beam which is reflected by surfaces in the field of view.

The invention thus provides a combination of a picture detecting optical sensor with a LADAR sensor. By the additional use of the LADAR sensor, also the distance of the objects can be determined in addition to the two-dimensional structure thereof. Information about the absolute magnitude of a detected object can be determined therefrom. When the field of view is scanned by a laser light beam, it is also possible to obtain information about the Three-dimensional structure of the object, that is a kind of relief. The scanning by means of a laser light beam permits sufficiently high resolution in contrast to sensors operating with millimeter waves.

The LADAR sensor may operate either as FMCW-LADAR or as pulse-LADAR.

If the field of view is scanned by means of the LADAR-sensor with the same resolution, e.g. in a 512×512 picture matrix, and at the same frame frequency of e.g.. 25 frames per second as this is done with the passive optical sensor, this will result in a very high scanning frequency of e.g.. 6,5 megacycles per second. Such a scanning frequency is difficult to achieve with a LADAR sensor. In accordance with a further modification of the invention, the picture detecting sensor unit further comprises scanning means for scanning the field of view with the laser beam of said LADAR sensor, said scanning means being controlled by said picture processing means receiving data from said passive sensor.

Preferably, said scanning means of said LADAR sensor are controlled to limit the scanning effected by the LADAR sensor to objects detected in the field of view by said passive sensor.

The picture processing means may comprise segmentation means for the segmentation of objects detected by said sensor in the field of view, the LADAR sensor being controlled to scan such segmented objects only.

If the LADAR sensor is controlled this way, the sensor needs not have to scan the whole field of view at the frame frequency of e.g.. 25 cycles per second. This field of view may contain an object to be identified in a small area only. The rest of the field of view is background without interest. Thus, at first, a selection is made by the passive sensor and the associated picture processing, which partial area of the field of view is worth considering for scanning by the LADAR sensor. Such a partial area forms e.g. a picture matrix of 16×16. Considerably smaller scanning frequencies in the range of 10 kilocycles per second are sufficient for the scanning of such a limited partial area at the frame frequency of 25 frames per second. Such scanning frequencies are easy to handle.

The scanning of the objects by means of the LADAR-sensor can be expedited in that said scanning means of said LADAR-sensor are controlled to scan, in a first scanning cycle, the objects detected by said passive sensor along a path sweeping over the objects ony once, whereby first scanning cycle information is obtained, and to scan, in a second scanning cycle, line-by-line limited areas of the field of view, each of which contains one of said objects, and said first scanning cycle information is applied to selecting means for selecting, from said objects detected by said passive sensor, those objects meeting predetermined criteria, said scanning means of said LADAR-sensor being controlled by said selecting means to scan, during said second scanning cycle, only the areas containing the objects thus selected.

In order to make a compact and space saving sensor unit., a common imaging optical system is provided for the LADAR sensor and for the passive sensor, a beam splitter being provided for separating the beams falling on the passive sensor and the returning beams of the LADAR sensor.

Two embodiments of the invention are described in further detail hereinbelow with reference to the accompanying drawings.

Figure 1:
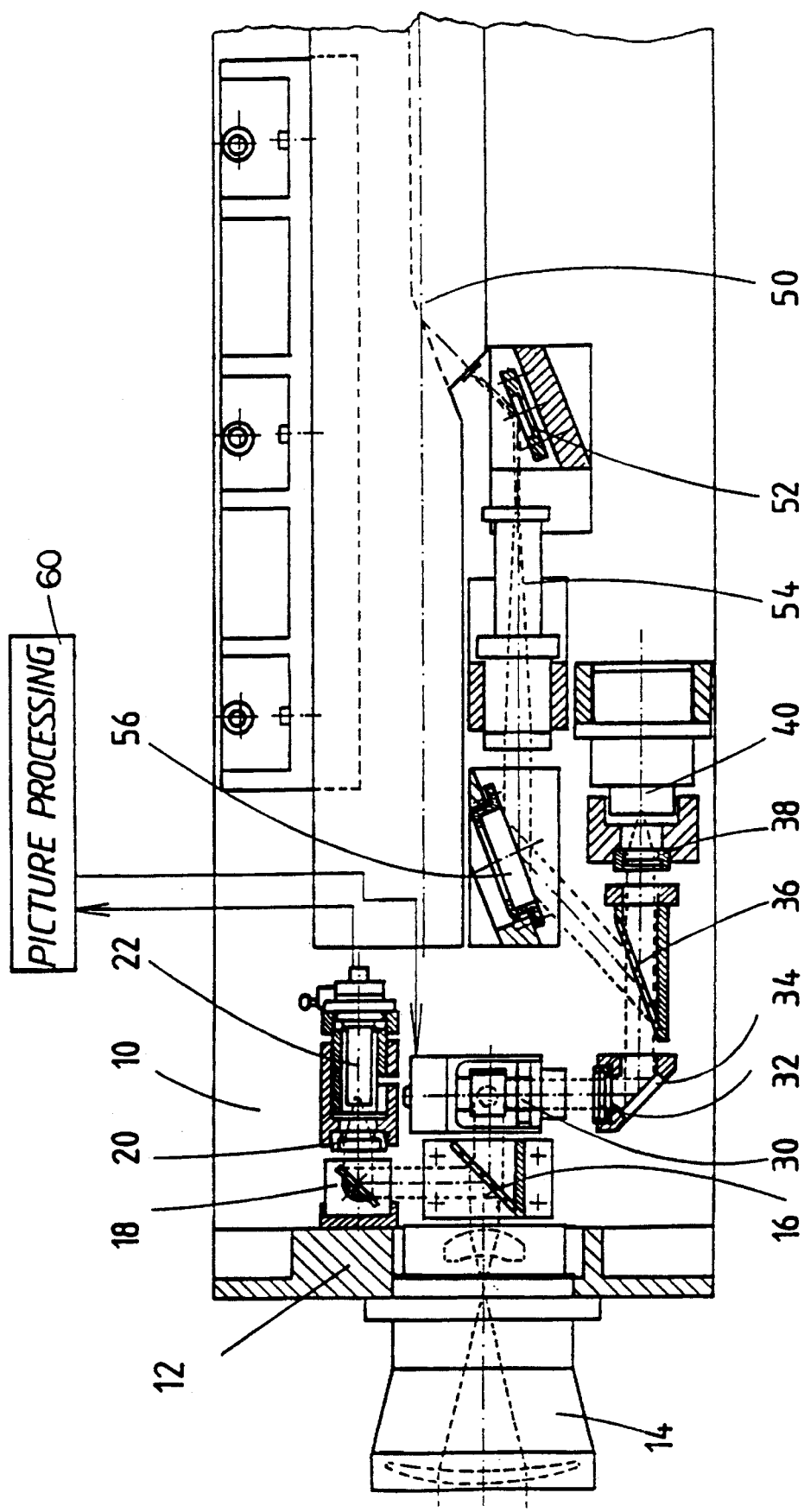
FIG. 1 shows the construction of a sensor unit having a passive picture detecting optical sensor and a LADAR sensor which both operate with a common imaging optical system and in which the LADAR sensor is controlled by the picture processing of the passive sensor.

In FIG. 1, numeral 10 designates a structure on which the sensor unit is mounted. The structure 10 has a flange 12. An optical system 14 is mounted on the flange 12. The optical system 14 is common to both the passive picture detecting optical sensor and to the LADAR sensor and defines a common aperture for both sensors.

A wave length selective beam splitter 16 separates the paths of rays of the passive picture detecting optical sensor and of the LADAR sensor. The path of rays of the passive sensor is reflected by the beam splitter 16 and directed by a deflecting mirror 18 and a further optical element 20 onto a detector 22. The detector 22 is a CCD detector (Charge Coupled Device) having a two-dimensional array of detector elements forming a 512×512 matrix. However, the detector may be, instead, also a line detector having an one-dimensional array of detector elements. In this case the deflection mirror 18 is a vibrating mirror causing the field of view to be scanned row by row.

The path of rays of the LADAR sensor passes through the wave length selective beam splitter 16. A scanning system 30 is provided in the path of rays. The scanning system comprises a mirror, which can be controllably rotated about two mutually orthogonal axes through defined angles. The path of rays—on the way back—passes through a quarter wave plate 32, through a deflecting mirror 34 and through a polarisation beam splitter 36. The light beam passing through the polarisation beam splitter 36 is focused by an optical element 38 on a laser detector 40.

A laser light beam coupled out of the laser 50 is linearily polarized. This laser light beam is directed to a deflecting mirror 52 and deflected thereby. The laser light beam is enlarged by optical system 54. A deflecting mirror 56 then deflects the laser light beam towards the polarisation beam splitter 36. The linearily polarized laser light beam is incident on the polarisation beam splitter 36 at the Brewster angle. Thereby, the outgoing laser light beam is coupled into the path of rays without loss.

After having passed through the quarter wave plate 32 the outgoing laser light beam is circularly polarized. The laser light beam is deflected by the scanning system 30, passes through the wave length selective beam splitter 16 and emerges through the optical system 14. The returning laser light beam reflected by an object is also circularly polarized. The returning laser light beam runs the same way back through the optical system 14, through the scanning system 30, through the wave length selective beam splitter 16 and the quarter wave plate 32. After having passed through the quarter wave plate 32, the laser light beam is again linearily polarized. However, the polarisation plane of the returning laser light beam is rotated by 90° as compared to the polarisation plane of the outgoing laser light beam. The polarisation beam splitter 36 has a high transmission for the thus polarized laser light beam. Thereby, the returning laser light beam can reach the laser detector 40 through the polarisation beam splitter 36 substantially without loss.

The picture data of the detector 22 of the passive sensor are applied to a picture processing device 60. The picture processing device 60 causes segmentation of individual objects and selects individual objects of interest in the field of view. The picture processing device controls the scanning system 30 such that it scans a partial area of the field of view containing such an object of interest. Such a partial area may cover e.g.. 16×16 picture elements or pixels. Such a partial area is considerably smaller than the whole field of view. Thus it can be scanned at a considerably lower scanning frequency of e.g.. 10 kilocycles per second than the frequency which would be necessary for scanning the whole field of view at the same frame frequency.

Figure 2:
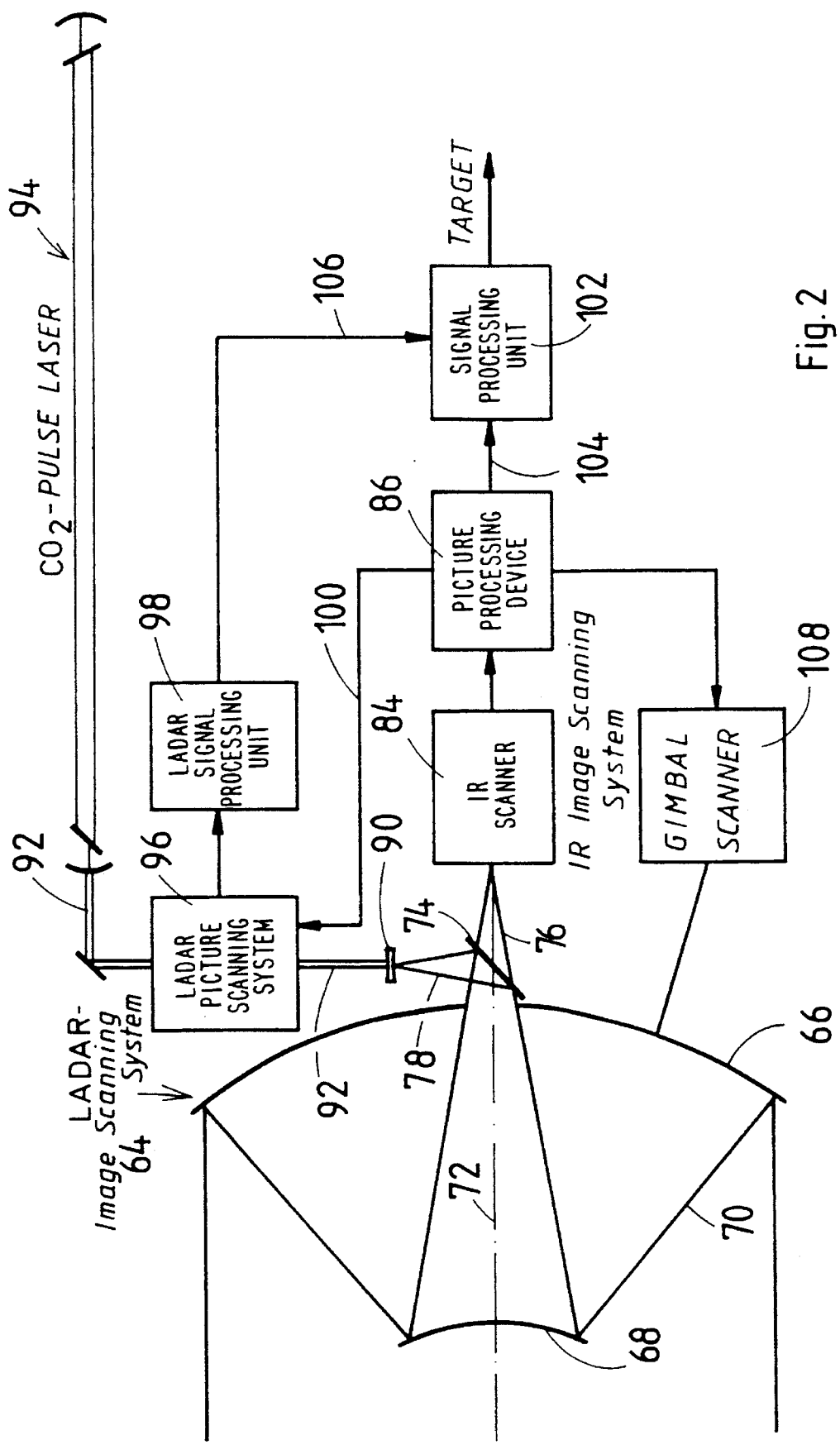
FIG. 2 is a schematic illustration of another embodiment of the sensor unit and a block diagram which illustrates schematically the various functions of the sensor unit.

FIG. 2 shows schematically the design of a modified sensor unit, the various functions being illustrated in the form of a block diagram.

The sensor unit of FIG. 2 has an optical system 64, which is, again, common to the passive sensor and to the LADAR-sensor. In the embodiment of FIG. 2, the optical system 64 comprises an annular concave mirror 66, which faces the observed field of view, and a convex secondary mirror 68. The secondary mirror faces the concave mirror 66 and receives the light beam 70 focussed by the concave mirror 66. The secondary mirror 68 reflects this light beam 70 along the optical axis 72 of the concave mirror 66 through a central opening of the concave mirror 66. A partially transparent mirror 74 is arranged in the converging part of the beam behind this central opening and at an angle of 45° with respect to the optical axis 72.

The path of rays is divided by the partially transparent mirror 74 into a path of rays 76 of the passive sensor and a path of rays 78 of the LADAR-sensor.

Figure 3:
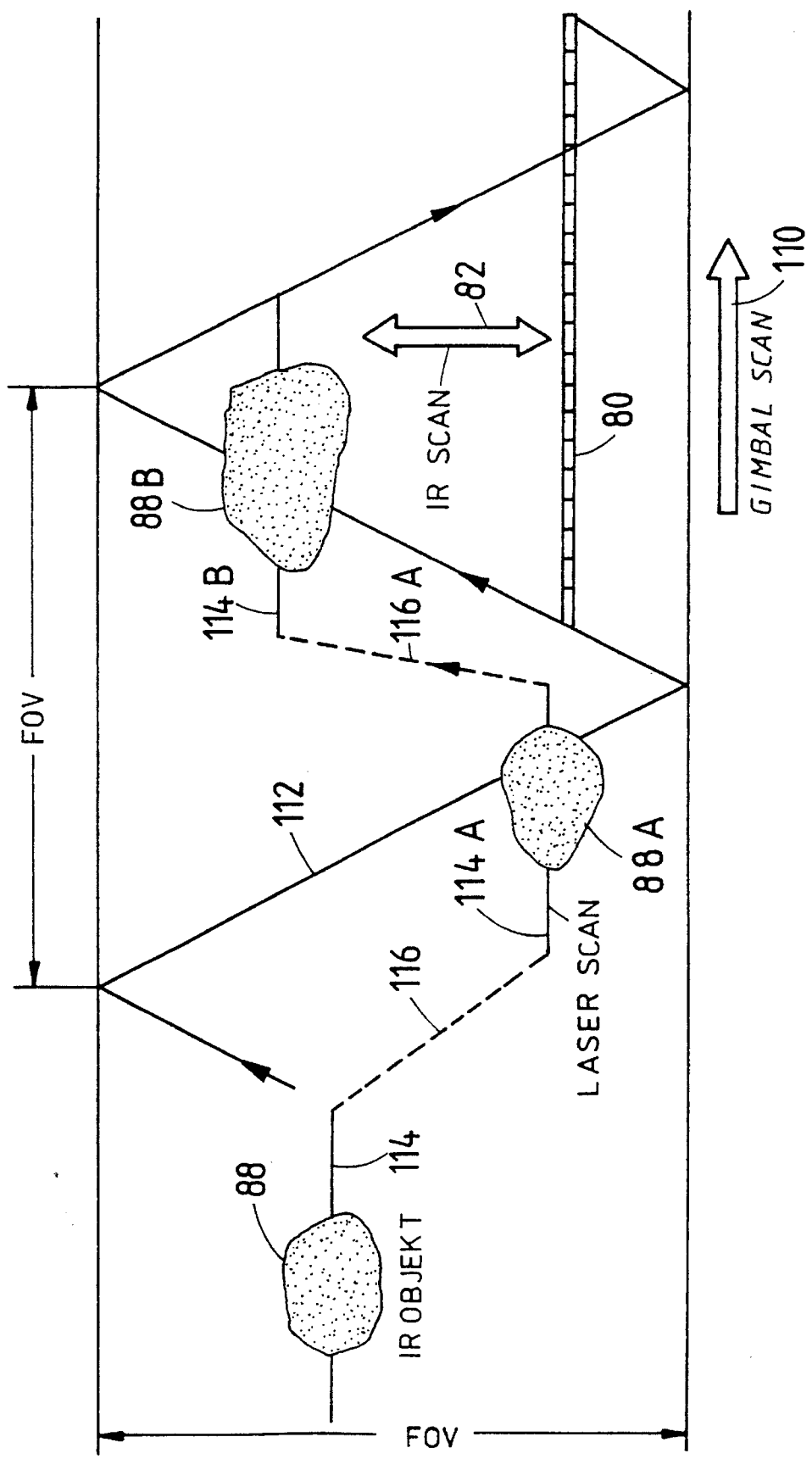
FIG. 3 shows the scanning of the field of view by the scanning beam of the LADAR-sensor in a first scanning cycle controlled by the signals of the passive sensor.

In the embodiment of FIG. 2, the passive sensor has linear detector array, which scans a field of view two-dimensionally via an oscillating mirror. The detector array consists of a linear array of infrared-sensitive detector elements. In FIG. 3, the detector array in the image plane of the imaging optical system 64 has the reference numeral 80. The scanning of the field of view via an oscillating mirror is symbolized by a double arrow 82 in FIG. 3. In FIG. 2, the detector array 80 with the oscillating mirror are generally illustrated as an IR-scanner 84.

Figure 4:
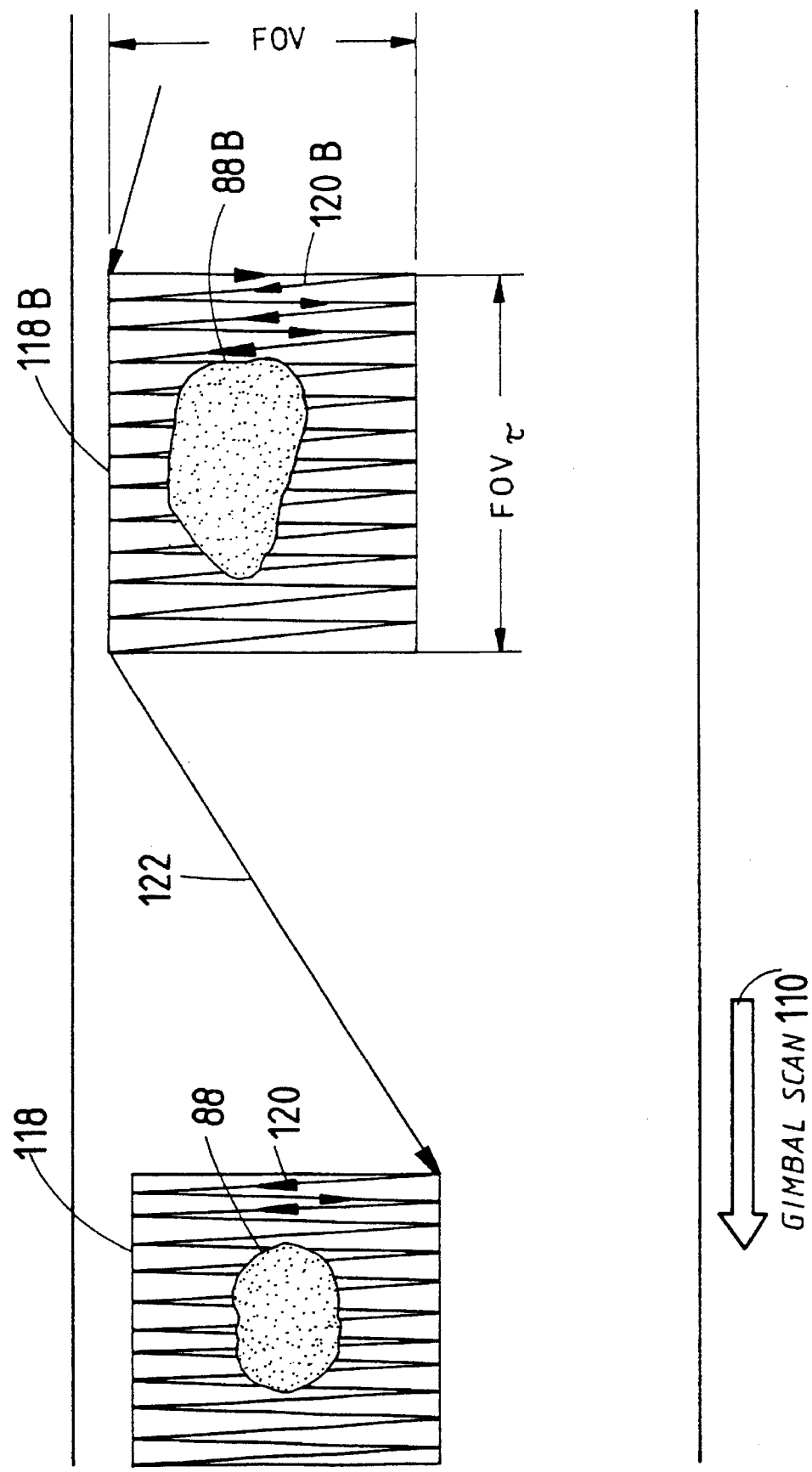
FIG. 4 shows the scanning of the field of view by the scanning beam of the LADAR-sensor in a second scanning cycle controlled by the signals of the passive sensor.

The IR-scanner 84 of the passive sensor provides a two-dimensional picture of the field of view. This picture is processed by a picture processing device 86. The picture processing device 86 comprises segmenting means for the segmentation of the individual objects observed in the field of view. Such objects are illustrated in FIGS. 3 and 4 and are designated by numerals 88, 88A and 88B.

The path of rays 78 of the LADAR-scanner includes a negative lens 90. The negative lens makes the outgoing, collimated laser light beam 92 of the LADAR-sensor divergent, and recollimates the returning laser beam. The laser beam is generated by a laser 94 designed as a $CO_2$-pulse laser. A LADAR-picture scanning system 96 is arranged to deflect, in two dimensions, the laser light beam generated by the laser 94. Thereby, an area can be scanned, as schematically shown in FIG. 4. The LADAR-picture scanning system 96 can have a mirror arranged to be deflected about two axes, similar to the mirror of the LADAR-picture scanning system 30 of FIG. 1. The LADAR-picture scanning system 96 provides signals which are applied to a LADAR-signal processing unit 98. The LADAR-signal processing unit 98 provides distance information, each distance information being associated with a particular location in the field of view of the LADAR-picture scanning system 96.

The LADAR-picture scanning system 96 is controlled by the signal processing device 86 of the passive sensor. To this end, the deflections of the mirror of the LADAR-picture scanning system 96 are commanded. This is illustrated in FIG. 2 by the connecting line 100. The control of the LADAR-picture scanning system 96 will be described hereinbelow with reference to FIGS. 3 to 6.

The picture information from the picture processing device 84 and the distance information from the LADAR-signal processing unit 98 are applied to a further signal processing unit 102. This is illustrated in FIG. 2 by the connecting lines 104 and 106, respectively. The signal processing unit 102 determines therefrom a three-dimensional representation of a detected object 88 or 88A or 88B. From this three-dimensional representation, the signal processing unit establishes which of the objects 88, 88A and 88B can be regarded as a "target". A guided missile may, for example, directed to this target.

A gimbal scanning device 108 superimposes the scanning of a larger field of view by rotating the whole sensor unit of FIG. 2 in a gimbal (not shown). This is schematically represented in FIG. 3 by an arrow 110.

The scanning of the field of view by the passive sensor, i.e. the linear detector array 80, can be seen best from FIG. 3. The detector array 80 extends in horizontal direction in FIG. 3 and scans the field of view transversely thereto, i.e. vertically in FIG. 2. This is schematically shown by the double arrow 82. A scanning of the field of view longitudinally of the detector array is superimposed to this scanning movement. This longitudinal scanning is caused by the gimbal scanning device 108 and is schematically illustrated by the arrow 110 in FIG. 3. Correspondingly, the field of view is scanned along a zigzag path 112. The scanning movement caused by the oscillating mirror and represented by the double arrow 82 and the gimbal scanning movement represented by arrow 110 are matched such that—in the image plane—during one cycle of the back-and-forth scanning movement represented by double arrow 83, the gimbal scanning movement represented by arrow 110 has advanced by about the length of the detector array 80.

The scanning movement of the LADAR-picture scanning system 96 is limited to those regions of the field of view in which the passive sensor has detected objects 88 at all. Furthermore, scanning is effected in two scanning cycles. A first scanning cycle seves to eliminate, from the objects detected by the passive sensor, those objects which cannot be regarded as valid targets from the beginning. This may, for example, be objects which do not show a three-dimensional structure.

In the first scanning cycle, the objects 88, 88A, 88B are scanned along a straight path 114 extending once across the object 88, 88A or 88B. From the path 114 of a first object 88, the LADAR-picture scanning system 96 jumps, along the path 116 shown by a dashed line, to the region of the next object 88A. The object 88A is then scanned again along a straight path 114A extending once across the object 88A. From the region of the object 88A, the LADAR-picture scanning system 96 jumps to the region of the object 88B along the path 116A shown by a dashed line. The object 88B is scanned along a straight path 114B extending once across the object 88B.

Thanks to this relatively quick "linear" scanning of all detected objects, individual objects such as object 88A can be excluded from being regarded a valid target. Then the complete scanning by the LADAR-picture scanning system 96 needs only be carried out, in a second scanning cycle, with the remaining objects 88 and 88B. This is illustrated in FIG. 4. The complete scanning of the objects 88B and 88 is effected in a second scanning cycle during the return run of the gimbal scanning movement. This scanning is effected by scanning always only a limited area 118B, 118 containing the respective object. This area is scanned along a zigzag path 120B and 120, respectively. Between these zigzag paths 120B and 120, the LADAR-picture scanning system 96 jumps along a path 122 from the area 118B to the area 118. The object 88A is spared.

The LADAR-sensor operates more slowly than the passive sensor. Thanks to the limitation of the areas scanned by the LADAR-sensor and the selection of the objects detected by the passive sensor, the information from the LADAR-sensor can, nevertheless, be available simultaneously with the information from the passive sensor. The signal processing unit 102 provides a three-dimensional representation of the object.

Figure 5:
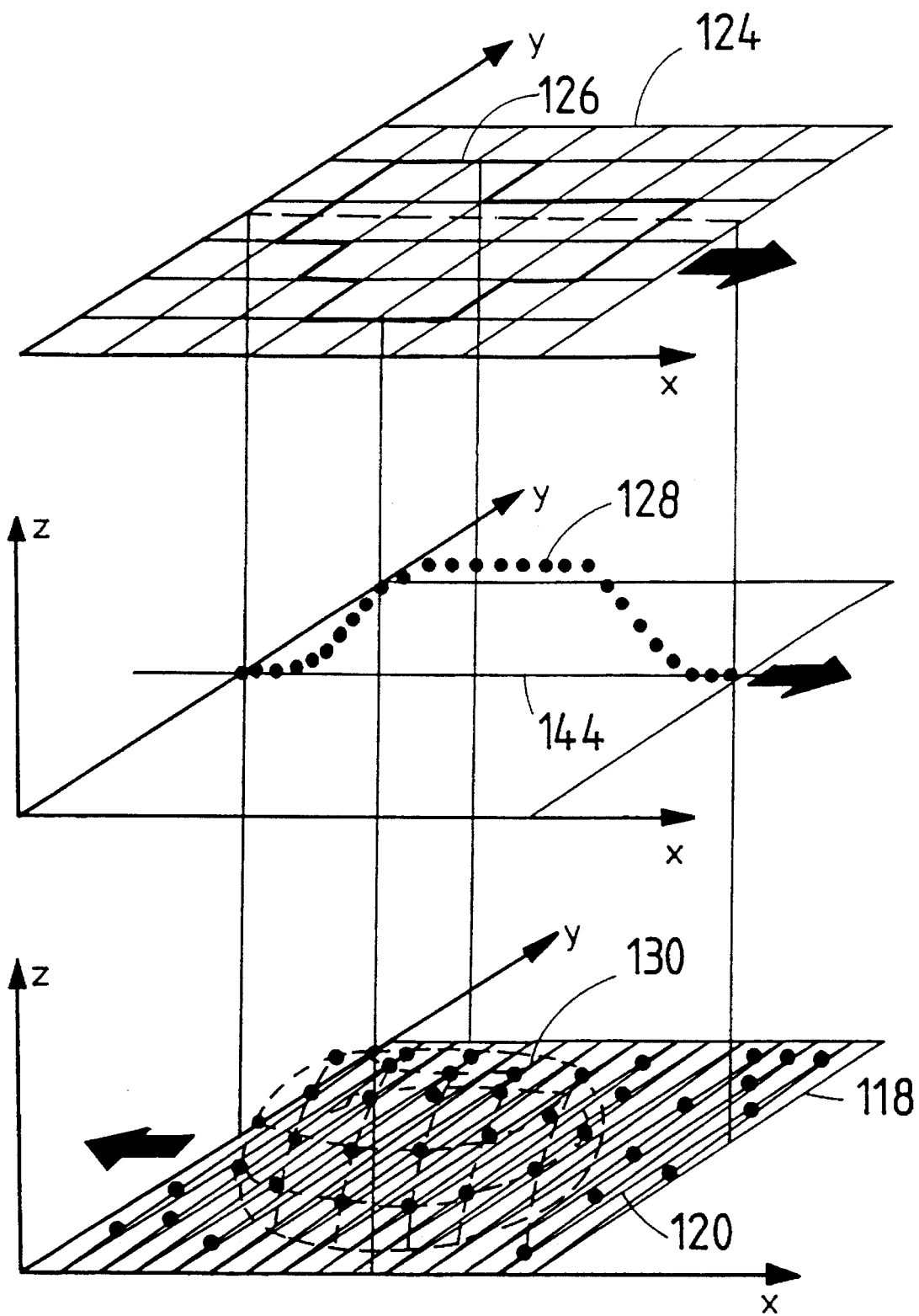
FIG. 5 is a schematic illustration and shows, one on top of the other, the informations which are obtained about the object by means of the passive sensor and by means of the LADAR-sensor during the first and second scanning cycles.

In FIG. 5, the various informations about the object, for example object 88, are schematically illustrated.

A pixel matrix 124 is shown in the upper portion of FIG. 5. In this pixel matrix 124, the field of view of the passive sensor is subdivided into a raster of picture elements (pixels). In this pixel matrix 124, an object 88 appears as a two-dimensional pattern 126.

After the object 88 has been scanned in the first scanning cycle, as illustrated in FIG. 3, information is available about the distance of those individual portions of the object 88, which are located on the straight, one-dimensional path 114. This provides a profile 128 as illustrated in the median part of FIG. 5. Thereby the object 88 has qualified as possible target.

The object 88 is then scanned two-dimensionally as shown in FIG. 4. This two-dimensional scanning provides a complete three-dimensional representation 130 of the surface of the object 88. Based on this representation, a certain type of object may then be selected as target.

Figure 6:
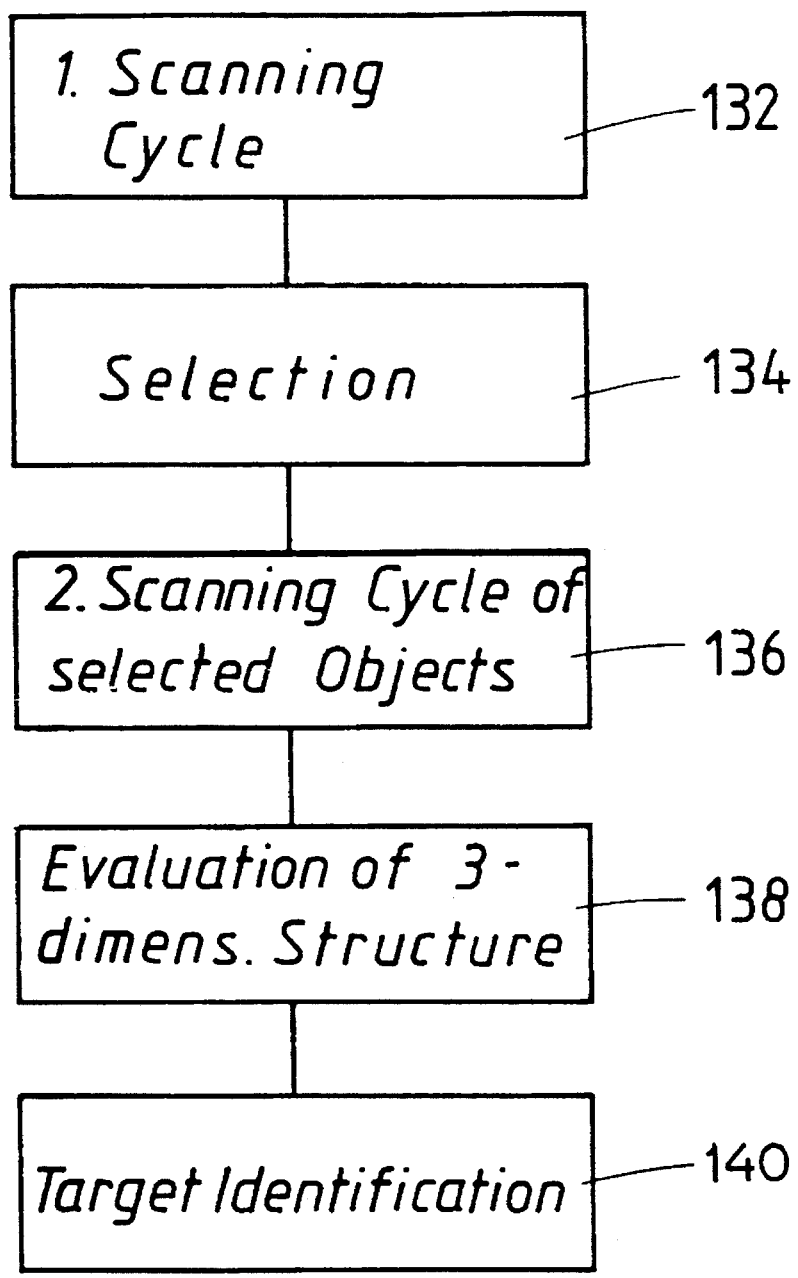
FIG. 6 shows the sequence of the first and second scanning cycles of the LADAR-sensor.

FIG. 6 illustrates the sequence of the scanning by means of the LADAR-sensor.

At first, there is a first scanning cycle as shown in FIG. 3. This is represented by rectangle 132. Based on this first scanning cycle, a selection is made. This is represented in FIG. 6 by rectangle 134. The second scanning cycle as shown in FIG. 4 is now applied to the selected objects only. This second scanning cycle is represented by rectangle 136. The signal processing unit 102 now evaluates the data to determine the three-dimensional structure of the object. This is represented by rectangle 138. Eventually, a target is identified on the basis of the structure thus determined. This is represented by rectangle 140.

In certain cases, no scanning may be necessary at all. It might be sufficient to determine just the distance of the detected object. This distance would permit, together with the picture at the detector 22, a statement about the absolute magnitude of the object.

I claim:

1. A device for detecting and identifying an object in a field of view comprising:

laser means for generating a laser beam and means for directing said laser beam towards said object;

scanning beam deflecting means for deflecting said laser beam to scan two-dimensionally over all of the surface of said object;

LADAR sensor means exposed to laser light reflected by said object for providing relief information for each scanned spot of said object;

optical system means for forming an image of said field of view in an image plane;

passive image resolving sensor means in said image plane for providing picture output signals indicative of the two-dimensional image of said field of view;

beam splitter means between said optical system means and said image plane for directing said laser beam deflected by said scanning beam deflecting means through said optical system means towards said object and for directing said reflected laser light towards said LADAR sensor means;

image processing means to which said picture output signals from said passive image resolving sensor means are applied for segmenting and detecting individual objects within said field of view, said image processing means being arranged to control said scanning beam deflecting means such that said laser beam scans substantially only the surface of objects detected by said image processing means within said field of view;

means for deriving, from said relief information, a three-dimensional relief representation of said object; and means for identifying said object on the basis of said three-dimensional relief representation.

2. A device for detecting and identifying an object in a field of view comprising:

laser means for generating a laser beam and means for directing said laser beam towards said object;

scanning beam deflecting means for deflecting said laser beam to scan two-dimensionally over all of the surface of said object;

LADAR sensor means exposed to laser light reflected by said object for providing relief information for each scanned spot of said object;

optical system means for forming an image of said field of view in an image plane;

passive image resolving sensor means in said image plane for providing picture output signals indicative of the two-dimensional image of said field of view;

beam splitter means between said optical system means and said image plane for directing said laser beam deflected by said scanning beam deflecting means through said optical system means towards said object and for directing said reflected laser light towards said LADAR sensor means;

image processing means to which said picture output signals from said passive image resolving sensor means are applied for segmenting and detecting individual objects within said field of view, said image processing means being arranged to control said scanning beam deflecting means such that said laser beam scans substantially only the surface of objects detected by said image processing means within said field of view; wherein said scanning beam deflecting means are controlled by said image processing means to scan, in a first scanning cycle, the objects detected by said passive image resolving sensor along a path sweeping over the objects only once, whereby first scanning cycle information is obtained, said first scanning cycle information is applied to selecting means for selecting, out of the objects detected by said passive image resolving sensor those objects meeting predetermined criteria, and said scanning beam deflecting means being controlled by said image processing means and said selecting means to scan, in a second scanning cycle, line-by-line, only limited areas of the field of view containing said selected objects;

means for deriving, from said relief information, a three-dimensional relief representation of said object; and means for identifying said object on the basis of said three-dimensional relief representation.

3. A device as claimed in claim 2, wherein said beam splitter is a wavelength-selective beam splitter.

4. A device as claimed in claim 3, wherein said scanning beam deflecting means are arranged between said beam splitter and said LADAR sensor means.

5. A device as claimed in claim 4, wherein a quarter wave plate and a polarization beam splitter are provided between said beam deflecting means and said LADAR sensor means, said quarter wave plate and polarization beam splitter being arranged to reflect said outgoing laser light beam from said laser means towards said optical system means and to pass said reflected laser light to a detector of said LADAR sensor means.

6. A device for detecting and identifying an object in a field of view comprising:

optical system means for forming an image of said field of view in an image plane;

passive image resolving sensor means in said image plane for providing picture output signals indicative of the two-dimensional image of said field of view;

laser means for generating a laser beam;

scanning beam deflecting means for deflecting said laser beam, LADAR sensor means;

beam splitter means between said optical system means and said image plane for directing said laser beam deflected by said scanning beam deflecting means through said optical system means towards said object to scan over the whole surface of said object and for directing light reflected by said object and collected by said optical system means towards said LADAR sensor means for providing relief information for each scanned spot of said object;

image processing means to which said picture output signals from said passive image resolving sensor means are applied for segmenting and detecting individual objects within said field of view, said image processing means being arranged to control said scanning beam deflecting means such that said laser beam scans substantially only the surface of objects detected by said image processing means within said field of view;

means for deriving, from said relief information, a three-dimensional relief representation of said object; and means for identifying said object on the basis of said two-dimensional image and said three-dimensional relief representation.

7. A device for detecting and identifying an object in a field of view comprising:

optical system means for forming an image of said field of view in an image plane;

passive image resolving sensor means in said image plane for providing picture output signals indicative of the two-dimensional image of said field of view;

laser means for generating a laser beam;

scanning beam deflecting means for deflecting said laser beam;

LADAR sensor means;

beam splitter means between said optical system means and said image plane for directing said laser beam deflected by said scanning beam deflecting means through said optical system means towards said object to scan over the whole surface of said object and for directing light reflected by said object and collected by said optical system means towards said LADAR sensor means for providing relief information for each scanned spot of said object;

image processing means to which said picture output signals from said passive image resolving sensor means are applied for segmenting and detecting individual objects within said field of view, said image processing means being arranged to control said scanning beam deflecting means such that said laser beam scans substantially only the surface of objects detected by said image processing means within said field of view; wherein said scanning beam deflecting means are controlled by said image processing means to scan, in a first scanning cycle, the objects detected by said passive image resolving sensor along a path sweeping over the objects only once, whereby first scanning cycle information is obtained, said first scanning cycle information is applied to selecting means for selecting, out of the objects detected by said passive image resolving sensor those objects meeting predetermined criteria, and said scanning beam deflecting means being controlled by said image processing means and said selecting means to scan, in a second scanning cycle, line-by-line, only limited areas of the field of view containing said selected objects;

means for deriving, from said relief information, a three-dimensional relief representation of said object; and means for identifying said object on the basis of said two-dimensional image and said three-dimensional relief representation.

* * * * *